US012502472B2

(12) United States Patent
Pesenti et al.

(10) Patent No.: US 12,502,472 B2
(45) Date of Patent: Dec. 23, 2025

(54) REGIONAL DECOAGULATION SYSTEM FOR EXTRACORPOREAL BLOOD-CIRCULATION CIRCUIT

(71) Applicants: UNIVERSITA' DEGLI STUDI DI MILANO, Milan (IT); FONDAZIONE IRCCS "CA' GRANDA—OSPEDALE MAGGIORE POLICLINICO", Milan (IT)

(72) Inventors: Antonio Maria Pesenti, Milan (IT); Alberto Zanella, Milan (IT)

(73) Assignees: UNIVERSITA' DEGLI STUDI DI MILANO (IT); FONDAZION IRCCS "CA' GRANDA—OSPEDALE MAGGIORE POLICLINICO (IT)

( * ) Notice: Subject to any disclaimer, the term of this patent is extended or adjusted under 35 U.S.C. 154(b) by 1085 days.

(21) Appl. No.: 17/427,271

(22) PCT Filed: Feb. 5, 2020

(86) PCT No.: PCT/IB2020/050930
§ 371 (c)(1),
(2) Date: Jul. 30, 2021

(87) PCT Pub. No.: WO2020/161647
PCT Pub. Date: Aug. 13, 2020

(65) Prior Publication Data
US 2022/0096723 A1    Mar. 31, 2022

(30) Foreign Application Priority Data
Feb. 5, 2019    (IT) .................... 102019000001667

(51) Int. Cl.
*A61M 1/36*    (2006.01)
*A61M 1/16*    (2006.01)
(Continued)

(52) U.S. Cl.
CPC ........ *A61M 1/3672* (2013.01); *A61M 1/1696* (2013.01); *A61M 1/1698* (2013.01);
(Continued)

(58) Field of Classification Search
CPC .............. A61M 1/3672; A61M 1/1696; A61M 1/1698; A61M 1/3434; A61M 1/3468;
(Continued)

(56) References Cited

U.S. PATENT DOCUMENTS

2014/0158604 A1\*  6/2014  Chammas ............... B32B 5/024
                                                         210/256
2017/0348472 A1\*  12/2017  Pesenti ............... A61M 1/3675
2018/0303995 A1\*  10/2018  Stange .................. B01D 61/28

FOREIGN PATENT DOCUMENTS

EP    3237035    11/2017

OTHER PUBLICATIONS

PCT International Search Report and Written Opinion for PCT Patent Application No. PCT/IB2020/050930 dated May 4, 2020.

\* cited by examiner

*Primary Examiner* — Nicholas J. Weiss
*Assistant Examiner* — Gabriella E Burnette
(74) *Attorney, Agent, or Firm* — McAndrews, Held & Malloy, Ltd.

(57) ABSTRACT

A system is described for the regional decoagulation of the blood in an extracorporeal circulation circuit comprising means for infusion of a solution of a citrate or citric acid on the main circuit, which are set upstream of the first filtration unit; means for infusion of a solution for electrolyte restoration on the main circuit, which are set downstream of the filtration unit and a secondary circuit for recirculation of the plasma water obtained by the filtration unit. The secondary circuit comprises: a first cartridge comprising an anion-exchange resin charged with chlorine ions; a second car-
(Continued)

tridge comprising a cation-exchange resin charged with sodium and potassium ions, which is set downstream of the first cartridge and means for removal of a first fraction of the plasma water obtained by the filtration unit.

9 Claims, 5 Drawing Sheets

(51) Int. Cl.
    *A61M 1/34*         (2006.01)
    *B01D 15/36*       (2006.01)

(52) U.S. Cl.
    CPC ........ *A61M 1/3434* (2014.02); *A61M 1/3468* (2014.02); *A61M 1/3486* (2014.02); *B01D 15/362* (2013.01); *B01D 15/363* (2013.01)

(58) Field of Classification Search
    CPC .. A61M 1/3486; B01D 15/362; B01D 15/363
    See application file for complete search history.

REGIONAL DECOAGULATION SYSTEM FOR EXTRACORPOREAL BLOOD-CIRCULATION CIRCUIT

CROSS-REFERENCE TO RELATED APPLICATIONS

The present application is filed pursuant to 35 U.S.C. 371 as a U.S. National Phase application of International Patent Application No. PCT/IB2020/050930, which was filed Feb. 5, 2020, claiming the benefit of Italian patent application no. 102019000001667 filed on Feb. 5, 2019. The entire text of the aforementioned applications is incorporated herein by reference in its entirety.

TECHNICAL FIELD

The present invention relates to a system for the regional decoagulation of the blood in an extracorporeal circulation circuit during the application of extracorporeal support techniques.

BACKGROUND ART

The possibilities of use for clinical purposes of techniques for the extracorporeal treatment of blood are extremely varied; they comprise an extensive group of therapies which includes intermittent or continuous renal support, apheretic and haemoperfusive treatments for removal of cytokines or toxins, the various extracorporeal support techniques for supporting the vital functions (known also as Extracorporeal Life Support or ECLS) including extracorporeal membrane oxygenation or ECMO, veno-arterial for cardiac support or veno-venous for respiratory support, and techniques for the extracorporeal removal of carbon dioxide ($ECCO_2R$).

All types of therapies that entail extracorporeal treatment of the blood also require the administration of an anticoagulant treatment, since the artificial surfaces are not able to reproduce the biocompatibility existing between blood and blood vessels. In the absence of said treatment, also called decoagulation, the contact of the blood with the surfaces of the circuits causes activation of the coagulation cascade and leads to progressive thrombosis of the circuit with consequent loss of the extracorporeal support function and possible embolism of the thrombi.

The known strategies for decoagulating the blood in extracorporeal treatments are divided into systemic or regional: the former are designed to decoagulate all the blood of the patient; the latter are designed to carry out a decoagulation aimed only at the level of the extracorporeal circuit. Each of the two strategies has advantages and drawbacks.

Systemic decoagulation is the strategy that has been used for longest and is the most widespread; its main advantage is its applicability to all extracorporeal blood flow regimes, but it exposes the patient to an increased risk of bleeding. It is normally obtained by means of continuous parenteral infusion of unfractionated heparin, which guarantees a rapid on-set, a short half-life, reversibility of the effect and low costs. The drawback of this drug is represented by the poor predictability of the clinical effect, requiring close monitoring with laboratory tests; furthermore, it is not exempt from side effects such as heparin-induced thrombocytopenia.

To obtain systemic decoagulation, low molecular weight heparin is also used, administered by subcutaneous injections. It has a more predictable relationship dose-effect than the unfractionated heparin, but it does not allow monitoring of the anticoagulant effect.

Other systemic anticoagulants, such as the direct inhibitors of thrombin or the X factor, are only rarely used, in the event of contraindications to heparin; they do not significantly reduce the risk of bleeding compared to heparin and have higher costs.

In recent years, to remedy the complications of the systemic anticoagulant treatments, regional decoagulation techniques have been developed which limit the anticoagulant effect to the blood present only in the extracorporeal circuit.

One of said techniques entails the infusion of a citrate or citric acid immediately after the blood taken from the patient enters the extracorporeal circuit, which is then antagonized by the infusion of calcium chloride prior to reintroduction of the blood in the patient.

An alternative technique is the infusion of unfractionated heparin in the circuit, antagonized by the infusion of protamine prior to reintroduction of the blood in the patient.

The infusion of heparin-protamine is not widely used since, in addition to the known problems with the systemic administration of heparin, there are also problems due to the infusion of protamine, a drug with a low therapeutic index, which has cardiovascular complications and can cause anaphylactic reactions.

On the other hand, regional decoagulation by infusion of citrate is a technique that has become widespread in recent years. This technique is based on the capacity of the citrate anion to chelate the blood calcium, which represents an essential factor for the functioning of the coagulation cascade. The citrate is infused at the beginning of the circuit mainly in the form of sodium citrate, while the calcium is reinfused at the end of the circuit in the form of calcium chloride, so that the blood returns to the patient with a normal coagulatory function.

The main drawback of the use of citrate is the fact that the majority of the infused citrate reaches the systemic circulation of the patient and consequently must be eliminated by the patient by means of metabolization (mainly hepatic). Even when the patient has a normal citrate clearance, and often this is not the case in critical patients, it is not possible to decoagulate extracorporeal blood flows higher than approximately 200 ml/min since this would require citrate doses higher than the clearance capacity of the patients and, consequently, the citrate would accumulate in the patient resulting in severe side effects.

Added to this problem is the difficult control of the concentration of the sodium administered as counter-ion of the citrate, which is infused in the form of trisodium citrate.

The need is therefore felt in the art to find an alternative strategy to obtain a regional decoagulation of the blood which is without the drawbacks of the known art.

DISCLOSURE OF INVENTION

The object of the present invention is to solve the previously mentioned technical problems.

In particular, the object of the present invention is to provide an alternative strategy for obtaining effective and safe regional decoagulation of the blood.

Said object is achieved by the present invention, relative to a system for the regional decoagulation of the blood according to claim 1 and an extracorporeal circulation circuit according to claim 7.

In particular, a system is provided for the regional decoagulation of the blood comprising a line for drawing the blood from the patient, a filtration unit for separating the plasma water, and a line for reintroducing the blood into the patient defining a main circuit.

The system of the invention further comprises:
means for the infusion of a solution of a citrate or citric acid on the main circuit positioned upstream of the filtration unit with respect to the direction of the blood flow;
means for the infusion of a solution for electrolyte restoration on the main circuit positioned downstream of the filtration unit with respect to the direction of the blood flow, and
a secondary circuit for recirculation of the plasma water obtained by the filtration unit.

The secondary circuit comprises:
a first cartridge comprising an anion-exchange resin charged with chlorine ions;
a second cartridge comprising a cation-exchange resin charged with sodium and potassium ions positioned downstream of the first cartridge in the flow direction of the plasma water in the secondary circuit; and
means for the removal of a fraction of the plasma water.

The first filtration unit can be chosen from the group consisting of haemodiafilter, a haemofilter, a dialyser and a plasma filter.

Advantageously, the present system allows the use of citrates or citric acid also on blood flows higher than 200 ml/min. In fact, the citrate infused in the blood passes almost entirely into the plasma water which, reaching through the secondary circuit the anion-exchange cartridge charged with chlorine ions, yields the citrate to the cartridge. The plasma water flowing out of the first anion-exchange cartridge charged with chlorine ions is therefore rich not only in chlorine ions but also in calcium ions released by the citrate. The calcium ions are then eliminated from the plasma water through the second cation-exchange cartridge charged with sodium and potassium ions.

The plasma water flowing out of the second cartridge which is re-sent to the filtration unit is therefore rich in chlorine ions, sodium and potassium ions, consequently the electrolyte balance of the blood flowing out of the filtration unit must be restored by the infusion of a solution for electrolyte restoration prior to reinfusion into the patient. The water balance of the blood is instead restored through the means for removal of a fraction of the plasma water positioned on the secondary circuit, obtaining the removal of part of the volume of water infused in the patient with the solution of citrate or citric acid and with the solution for electrolyte restoration.

Advantageously, the blood reinfused to the patient does not contain citrates but since it has a low calcium content, it is decoagulated all the same and therefore the volume of blood that can be treated with the extracorporeal circuit incorporating the system of the invention does not depend on the capacity of the patient to metabolize said substances.

Said system for decoagulation of the blood can therefore be incorporated in a circuit for extracorporeal circulation of the blood, in particular for the removal of $CO_2$.

BRIEF DESCRIPTION OF THE DRAWINGS

The present invention will now be described in detail with reference to the Figures of the attached drawings, which show purely illustrative and non-limiting embodiment examples, in which.

BEST MODE FOR CARRYING OUT THE INVENTION

Figure 1:
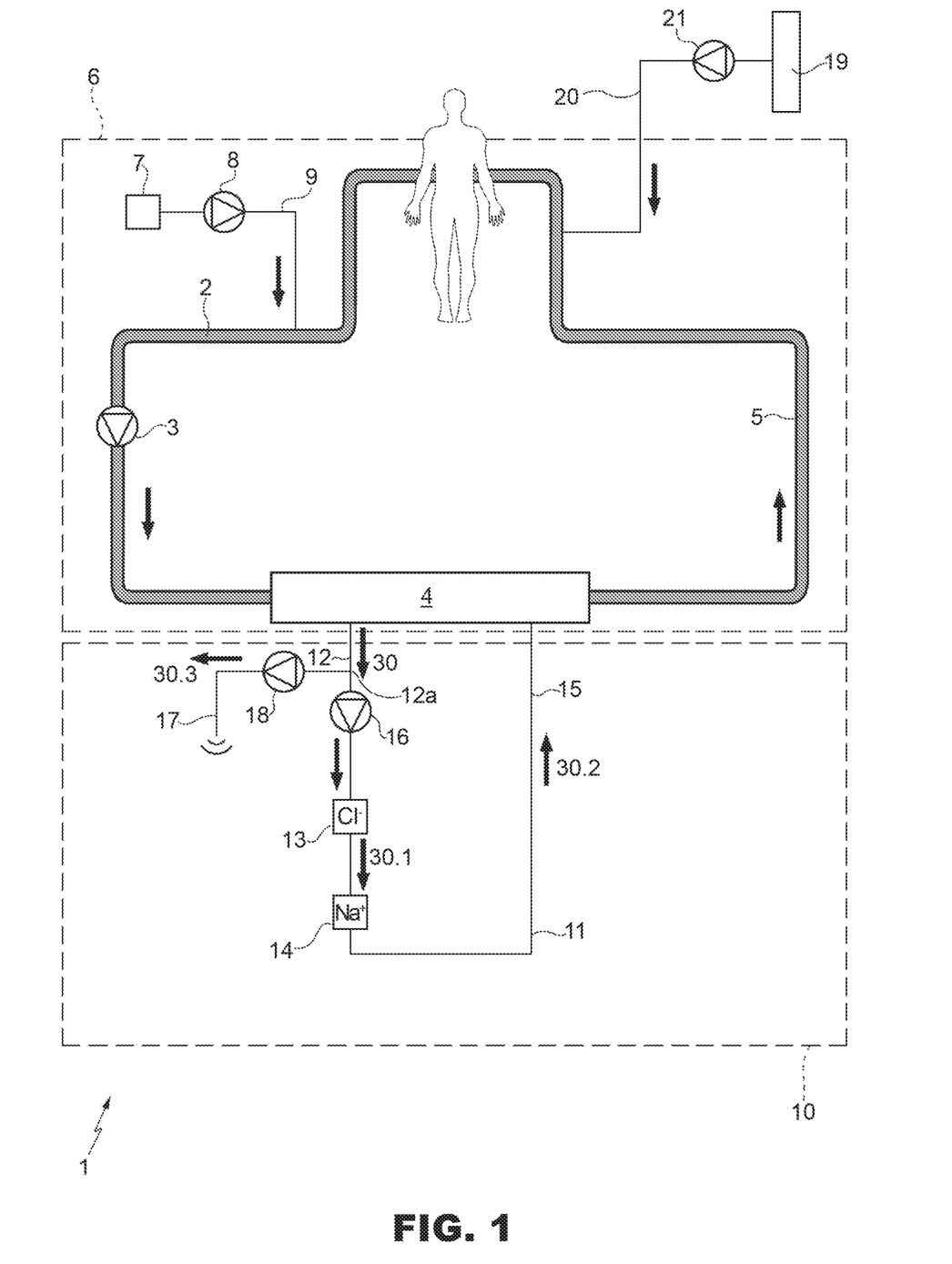
FIG. 1 illustrates a first embodiment of the invention.

In FIG. 1 a system for the regional decoagulation according to a first embodiment of the present invention is indicated overall by the number 1.

The system 1 comprises a line for drawing blood 2 from the patient, on which the following act: a pump 3, a filtration unit 4 and a line for reintroducing the blood 5 into the patient, said elements defining a main circuit 6.

In the embodiment illustrated in FIG. 1, the filtration unit 4 is a haemofilter.

Upstream of the filtration unit 4, a solution of citrates, for example sodium citrate or citric acid, is infused into the blood along the line 2 to allow the decoagulation thereof. As indicated previously, the decoagulation is obtained by chelation of the calcium present in the blood by the citrate. In FIG. 1, the citrate or the citric acid is contained in a bag 7 and is infused in the line 2 through the line 9 by means of the pump 8.

The blood then reaches the filtration unit 4 by means of the line 2.

Inside the filtration unit 4, the blood comes into contact with a filtering membrane which separates, by means of known haemofiltration or haemodiafiltration techniques, part of the water and the ions dissolved in the blood, obtaining the plasma water 30.

In the embodiment of FIG. 1, the plasma water 30 is then separated in the filtration unit 4 and recirculated by means of a secondary circuit 10. In the embodiment of FIG. 1, the secondary circuit 10 comprises a first recirculation circuit 11 consisting of the line 12, a first cartridge 13, a second cartridge 14 and the line 15. The first recirculation circuit 11 recirculates the plasma water in the filtration unit 4.

The flow of the plasma water 30 in the first recirculation circuit 11 is guaranteed by the presence of a pump 16.

The line 12 conveys the plasma water 30 towards a first cartridge 13, present on the first recirculation circuit 11 downstream of the pump 16 and comprising an anion-exchange resin charged with chlorine ions. Said resin has a greater affinity for the citrate than for the chlorine and therefore the plasma water 30.1 flowing out of the first cartridge 13 is without citrates but rich in chlorine ions and in calcium ions. In fact, removal of the citrate in the cartridge 13 also results in release into the plasma water 30.1 of the calcium ions previously chelated by the citrate. The calcium ions present in the plasma water 30.1 are then removed by a second cartridge 14, located downstream of the cartridge 13 in the direction of the flow of the plasma water 30 along the first recirculation circuit 11. The second cartridge 14 comprises a cation-exchange resin charged with sodium and potassium ions which has a greater affinity for the calcium ions than for the sodium and potassium ions. Therefore, the plasma water 30.2 flowing out of the second cartridge 14 is rich in sodium and potassium ions and substantially without calcium ions. The plasma water 30.2 flowing out of the second cartridge 14 is then re-sent to the filtration unit 4 by means of the line 15.

The blood flowing out of the filtration unit 4 is therefore rich in chlorine ions and sodium and potassium ions, and has a low level of calcium ions. It also has a water fraction higher than the physiological fraction due to the infusion of the citrate solution. Therefore, just before reinfusing the blood into the patient, a hydro-electrolytic balancing operation is required, which is carried out by removal of a fraction of the plasma water 30 from the recirculation circuit 11 and by reinfusion of a solution for electrolyte balance.

For said purpose, a first fraction 30.3 of plasma water 30 obtained by the filtration unit 4 is removed from the first recirculation circuit 11 at the node 12a located on the line 12 upstream of the first cartridge 13 by means of the line 17 thanks to the pump 18. Again, for the same purpose, a solution for electrolyte restoration contained in a bag 19 is reinfused by means of the line 20 thanks to a pump 21, along the line 5 just before reinfusion of the blood into the patient.

The volume of water contained in the first fraction 30.3 of plasma water 30 which is removed from the first recirculation circuit 11 must balance the volume of water introduced into the extracorporeal circuit through infusion of the solution of citrates and the solution for electrolyte restoration.

Furthermore, the moles of calcium ions, chlorine ions, potassium ions and bicarbonate ions present in the solution for electrolyte restoration must compensate for the moles of said ions lost through removal of the first fraction 30.3 of plasma water 30 and at the level of the first and second cartridges 13, 14. Obviously the water and electrolyte content of the blood which is reintroduced into the patient can be modulated differently according to the patient's clinical requirements.

Alternatively, the removal of a fraction of plasma water from the secondary circuit 10 can also be carried out between the first and the second cartridges or downstream of the second cartridge. The removal taking place upstream of one or both the cartridges will prolong their life, while removal downstream of the cartridges reduces the loss of ions and water and therefore the quantity thereof which must be restored by means of the solution for restoration.

The system of FIG. 1, in which the filtration unit 4 is a haemofilter, was tested in a pig model. The blood flow was set to 500 ml/min. Prior to the filtration in the haemofilter, the blood was decoagulated with the infusion of a solution containing a concentration of sodium citrate of 136 mmol/l. The citrate was infused by means of the pump 8 with a flow of 1103 ml/h. The plasma water obtained in the haemofilter was sent to the secondary circuit 10 by means of the pump 16 with a flow of 1500 ml/min. A fraction thereof was removed by means of the pump 18 with a flow of 87 ml/min. By means of the pump 21 a solution for electrolyte restoration was reinfused comprising sodium (52 mEq/L), chlorine (26 mEq/L), potassium (5 mEq/L), bicarbonates (50 mEq/L) and calcium (23 mEq/L) with a flow of 69 ml/min. The system was able to remove over 90% of the infused citrate without modifying the systemic electrolytes. It was therefore effective in obtaining decoagulation of a blood flow of 500 ml/min in an animal with a citrate clearance capacity below that of an adult man.

Figure 2:
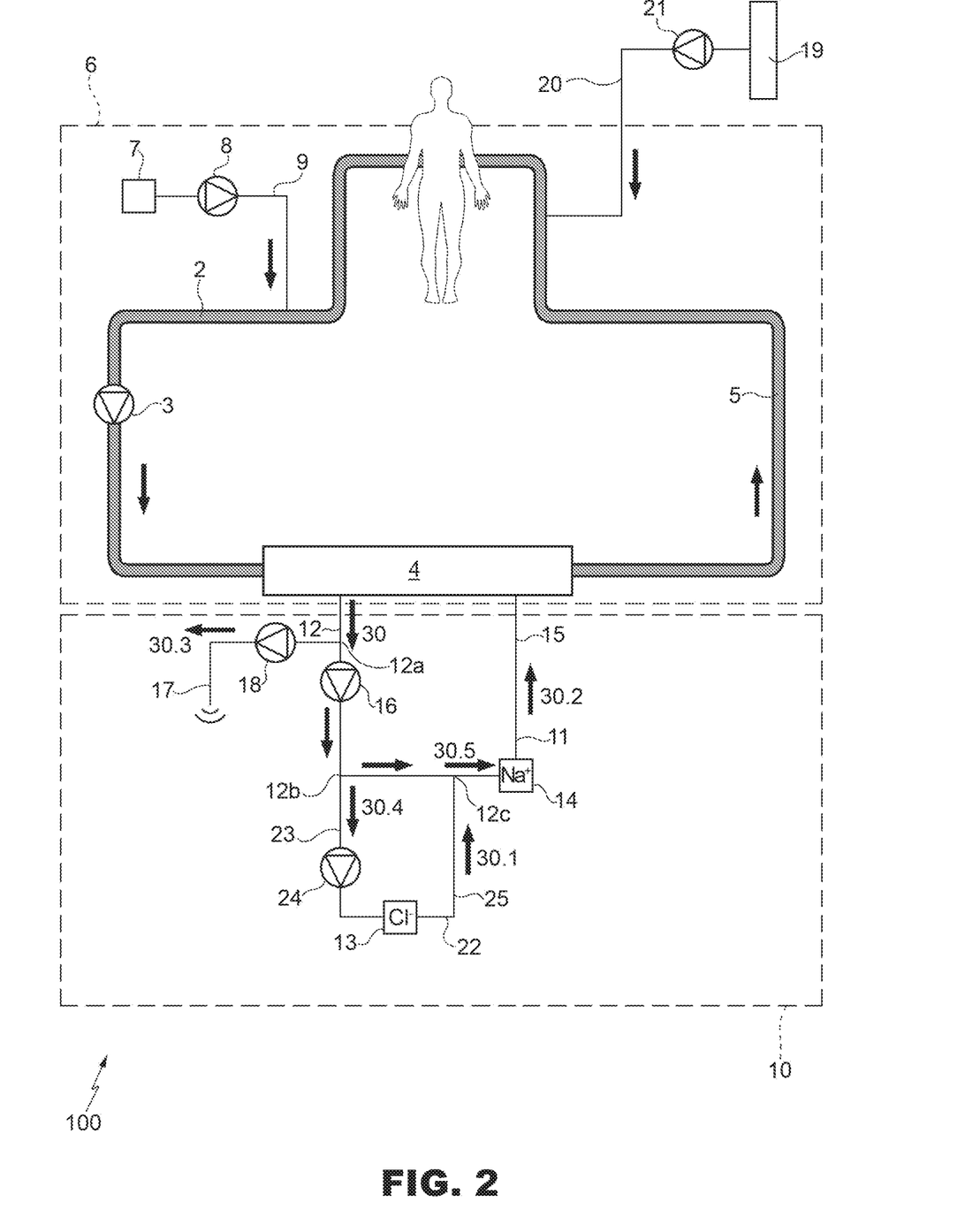
FIG. 2 illustrates a second embodiment of the invention.

FIG. 2 illustrates a second embodiment of the system 100 according to the present invention. The details that are similar or equal to those already described in FIG. 1 are indicated for the sake of simplicity by the same reference numbers.

In this embodiment, the system 100 was modified so that the first cartridge 13 comprising an anion-exchange resin charged with chlorine ions receives only a fraction 30.4 of the plasma water 30 present in the secondary circuit 10. In particular, in this embodiment, the secondary circuit 10 comprises a first recirculation circuit 11 and a second recirculation circuit 22 of the plasma water. The second recirculation circuit 22 is in fluidic connection with the recirculation circuit 11 by means of the nodes 12b and 12c both arranged upstream of the second cartridge 14 along the flow direction of the plasma water in the recirculation circuit 11.

The first recirculation circuit 11 consists of the line 12, the pump 16, the second cartridge 14 and the line 15.

The second recirculation circuit 22 consists of the line 23, the pump 24, the first cartridge 13 and the line 25.

In use, at the node 12b, a second fraction 30.4 of the plasma water 30 is sent by means of the line 23 and, via the pump 24, to the first cartridge 13 comprising an anion-exchange resin charged with chlorine ions. The plasma water 30.1 flowing out of the first cartridge 13 and without citrates is then reintroduced into the line 12 by means of the line 25, at the node 12c. The plasma water 30.1 is then reunited with the fraction of plasma water 30 that has not been filtered by the cartridge 13 to form the plasma water 30.5 which is then sent to the second cartridge 14 comprising the cation-exchange resin charged with sodium and potassium ions. The plasma water 30.2 flowing out of the second cartridge 14 is re-sent to the filtration unit 4 by means of the line 15.

In this embodiment there is therefore a partial removal of the citrates present in the plasma water 30 obtained by the filtration unit 4; said citrates are then reinfused into the patient and subsequently metabolized by the latter.

Also in this case the system 100 described above can be easily integrated in the most appropriate extracorporeal circulation systems for the therapy necessary to support the patient.

Figure 3:
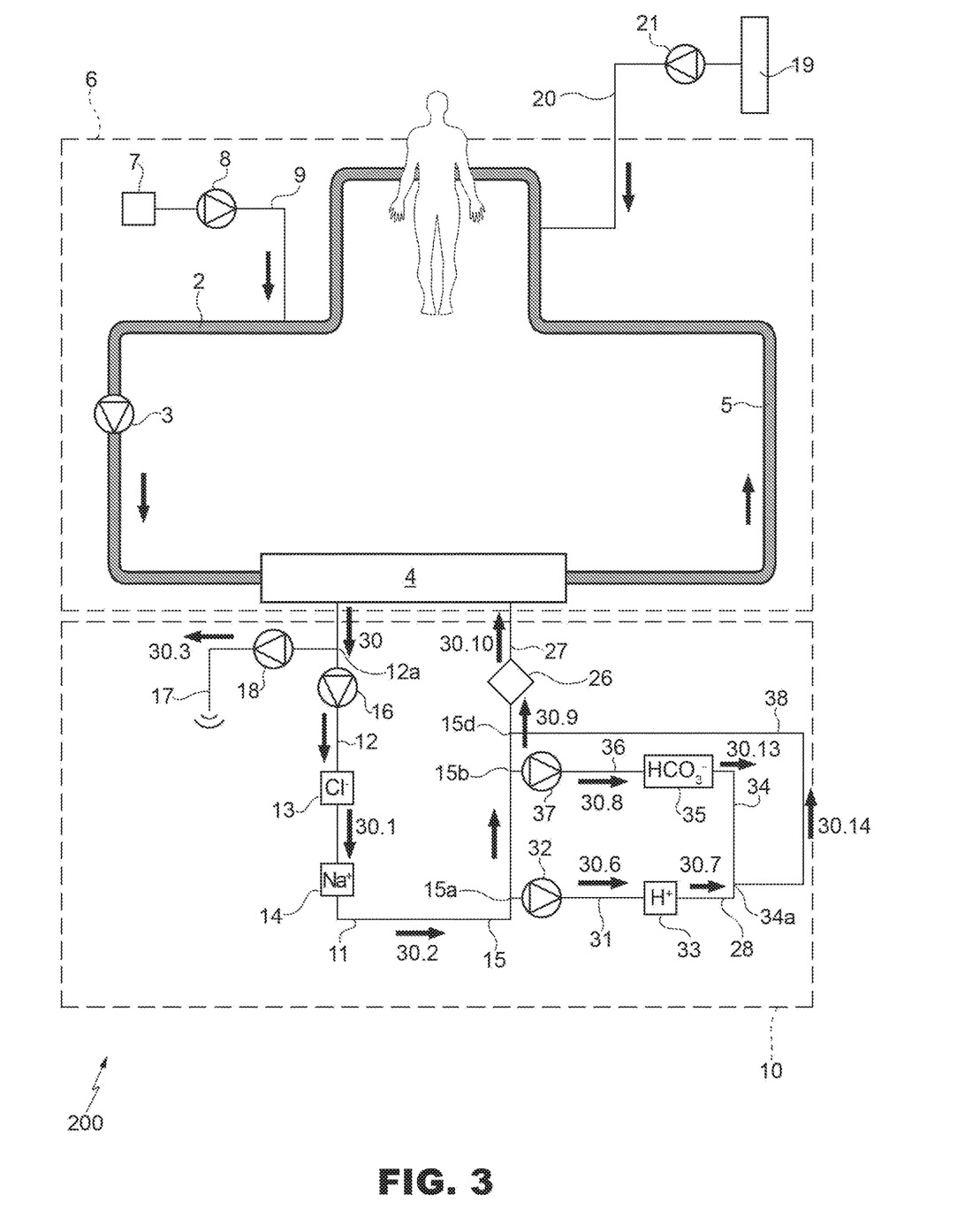
FIG. 3 illustrates a third embodiment of the invention.

FIG. 3 illustrates a third embodiment of the system 200 according to the present invention. The details that are similar or equal to those already described in FIG. 1 are indicated for the sake of simplicity by the same reference numbers.

In this embodiment, the system of FIG. 1 was modified so that a first and a second fraction of the plasma water 30.2 flowing out of the second cartridge 14 is treated to remove a portion of chlorine and sodium ions.

In particular, in this embodiment, the secondary circuit 10 comprises a recirculation circuit 11 and a third recirculation 28 in fluidic communication with the recirculation circuit circuit 11 by means of the nodes 15a and 15b both located downstream of the second cartridge 14 but upstream of the oxygenator 26 along the flow direction of the plasma water 30 in the recirculation circuit 11 and by means of the node 15d located upstream of the first oxygenator 26.

The recirculation circuit 11 consists of the line 12, the pump 16, the first cartridge 13, the second cartridge 14, the line 15, an oxygenator 26 and a line 27.

The third recirculation circuit 28 consists of a line 31, a pump 32, a third cartridge 33 comprising a cation-exchange resin charged with hydrogen ions, a line 36, a pump 37, a fourth cartridge 35 comprising an anion-exchange resin charged with bicarbonate ions, a line 34 and a line 38.

In detail, at the node 15a, a first fraction 30.6 of the plasma water 30.2 flowing out of the second cartridge 14 is sent by means of the line 31 and the pump 32 to a fourth cartridge 35 comprising a cation-exchange resin charged with hydrogen ions.

Said resin has a greater affinity for the sodium and potassium ions present in the plasma water 30.6 than for the hydrogen ions. Therefore, the plasma water 30.7 flowing out of the third cartridge 33 is rich in hydrogen ions and without sodium and potassium ions.

At the node 15b, a second fraction 30.8 of the plasma water 30.2 flowing out of the second cartridge 14 is sent by means of the line 36 and the pump 37 to a fourth cartridge 35 comprising an anion-exchange resin charged with bicarbonate ions.

The resin present in the cartridge 35 has a greater affinity for the chlorine present in the second fraction 30.8 of the plasma water 30.2 than for the bicarbonate ions. Therefore, the plasma water 30.13 flowing out of the fourth cartridge 35 is rich in bicarbonate ions and without chlorine ions.

The plasma water 30.13 is then reunited with the plasma water 30.7 in the node 34a along the line 34 and, via the line 38, reunited with the plasma water 30.2 at the node 15d, on the line 15 upstream of the first oxygenator 26, to form the plasma water 30.9 which is rich in hydrogen ions and bicarbonate ions. The hydrogen ions and the bicarbonate ions combine with one another according to the following balance to form carbon dioxide:

$$H^+ + HCO_3^- \rightarrow H_2O + CO_2$$

The carbon dioxide present in the plasma water 30.9 must therefore be eliminated before being re-sent to the filtration unit 4 by means of a first oxygenator 26 positioned on the line 15. The plasma water 30.10 flowing out of the first oxygenator 26 is then re-sent to the filtration unit 4 by means of the line 27.

In this embodiment therefore the plasma water 30.10 flowing out of the oxygenator 26 is without citrates and also without the chlorine ions and sodium ions added by the first and the second cartridges 13 and 14, therefore the solution for electrolyte restoration to be infused must have a composition such as to restore only the balance of the calcium and the potassium which is partly removed by the second and third cartridges 14 and 33.

The system of FIG. 3, in which the filtration unit 4 is a haemofilter, was tested in a pig model. The blood flow was set to 500 ml/min. Before filtration in the haemofilter, the blood was decoagulated with the infusion of a solution containing a sodium citrate concentration of 136 mmol/l. The citrate was infused by means of the pump 8 with a flow of 1103 ml/h. The plasma water obtained in the haemofilter was sent to the secondary circuit 10 by means of the pump 16 with a flow of 1700 ml/min. A fraction thereof was removed by means of the pump 18 with a flow of 1160 ml/min. By means of the pump 21 a solution for electrolyte restoration was reinfused comprising potassium chloride (2 mmol/ml) with a flow of 14 ml/h and calcium chloride (0.68 mmol/ml) with a flow of 45 ml/h.

The decoagulation system of the invention as described above can be easily integrated in the most appropriate extracorporeal circulation circuits for the therapy necessary to support the patient.

Said therapy can be, for example, a renal function replacement therapy, an extracorporeal removal of $CO_2$ or a removal of substances present in excess in the blood, for example cytokines, toxins, myoglobin, lactate, electrolytes, drugs.

Said extracorporeal therapy can be performed by positioning the appropriate device for carrying out the necessary therapy along the main circuit 6 downstream of the means for the infusion of citrate 7, 8, 9 but upstream of the means for infusion of the solution for electrolyte restoration 19,20, 21 or alternatively on the secondary circuit 10.

Figure 4:
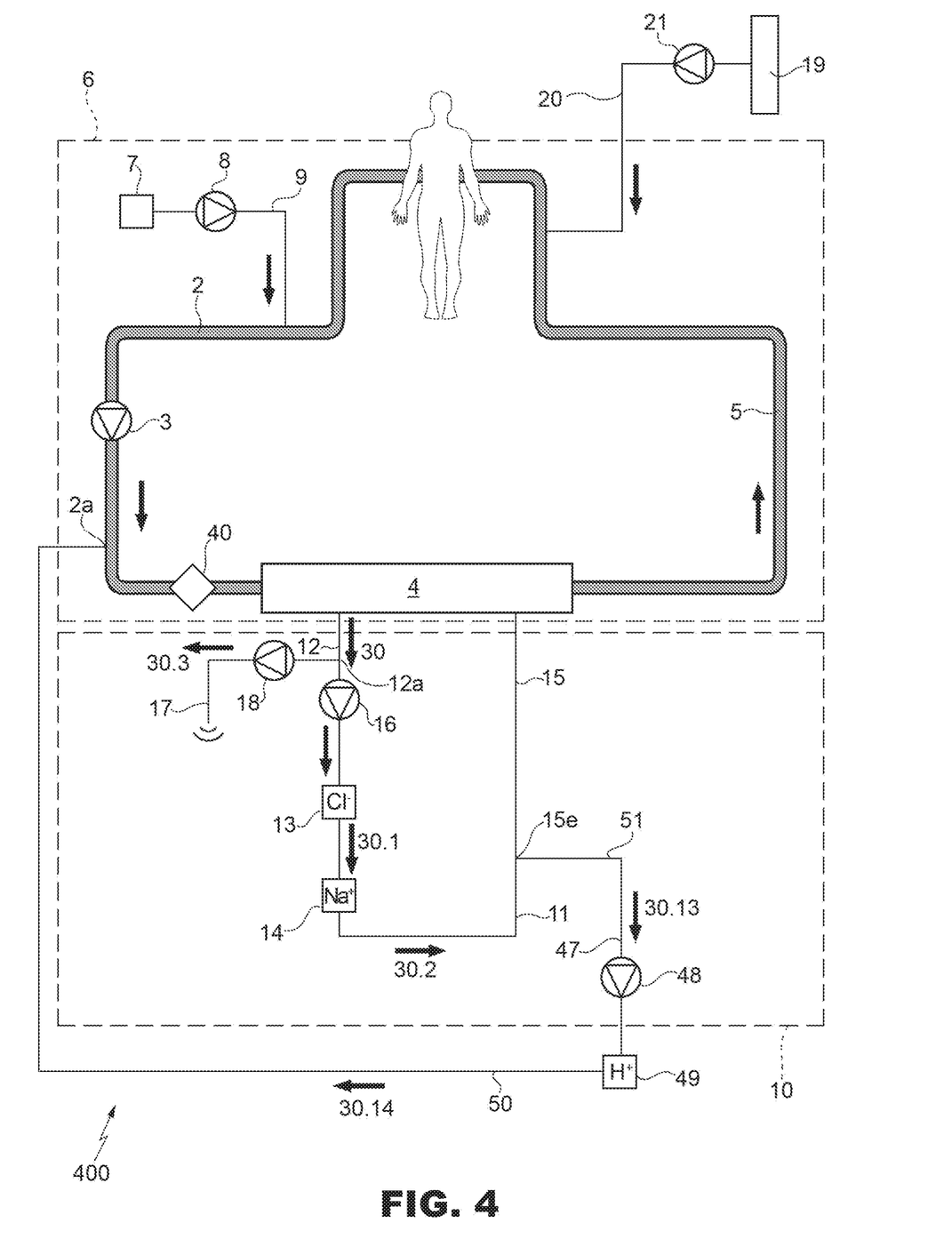
FIG. 4 illustrates a first extracorporeal circulation circuit of the blood for the removal of $CO_2$ comprising the system of FIG. 1.

FIG. 4 illustrates an example of an extracorporeal circulation circuit incorporating the system of the invention. In particular the extracorporeal circulation circuit 400 of the blood for the removal of $CO_2$ incorporates the decoagulation system of FIG. 1. The details that are similar or equal to those already described in FIG. 1 are indicated for the sake of simplicity by the same reference numbers.

In detail, to remove $CO_2$, along the line 2 there is a second oxygenator 40. The circuit 400 further comprises a fourth recirculation circuit 51 of the plasma water 30 on the line 2 for drawing blood from the patient.

The fourth recirculation circuit 51 is fluidically connected to the first recirculation circuit 11 at the node 15e positioned downstream of the second cartridge 14 along the flow direction of the plasma water 30 and with the main circuit 6 at the node 2a located upstream of the filtration unit 4 and of the oxygenator 40 on the line 2 but downstream of the means 7, 8, 9 for infusion of the citrate solution in the direction of the blood flow in the main circuit 6. Alternatively, the node 15e can be arranged upstream of the first cartridge 13 or between the first cartridge 13 and the second cartridge 14.

The fourth recirculation circuit 51 comprises the line 47, the pump 48, the fifth cartridge 49 comprising a cation-exchange resin charged with hydrogen ions and a line 50.

In use, a third fraction 30.13 of the plasma water 30.2 flowing out of the second cartridge 14 is sent to the node 15e, by means of the line 47 and via the pump 48 to the fifth cartridge 49.

Said resin has a greater affinity for the sodium and potassium ions present in the plasma water 30.13 than for the hydrogen ions. Therefore, the plasma water 30.14 flowing out of the fifth cartridge 49 is rich in hydrogen ions.

The plasma water 30.14 flowing out of the fifth cartridge 49 is re-sent to the line 2 at the node 2a by means of the line 50 favouring conversion of the bicarbonates present in the blood into carbon dioxide which is then removed by the second oxygenator 40. Alternatively, the fourth recirculation circuit 51 can be in fluidic connection with the first recirculation circuit 11 on one side and with the line 9 on the other to re-send the plasma water 30.14 to the main circuit 6 through the citrate infusion line.

In an alternative embodiment of the circuit 400 of FIG. 4, the second oxygenator 40 can be positioned downstream of the filtration unit 4. In this case, the plasma water 30.14 flowing out of the seventh cartridge 49 is re-sent to the main circuit 6 to line 5, at a node located upstream of the oxygenator 40 in the direction of the blood flow in the main circuit 6.

The infusion of H+ upstream of the oxygenator can alternatively be carried out by direct infusion, in the main circuit 6 or in the secondary circuit 10 upstream of the first oxygenator 26, of metabolizable acids, for example lactic acid, non-metabolizable acids, for example hydrochloric acid (in this case the chlorine must be subsequently removed) or by electrodialysis, for example as illustrated in the patent EP3237035.

Figure 5:
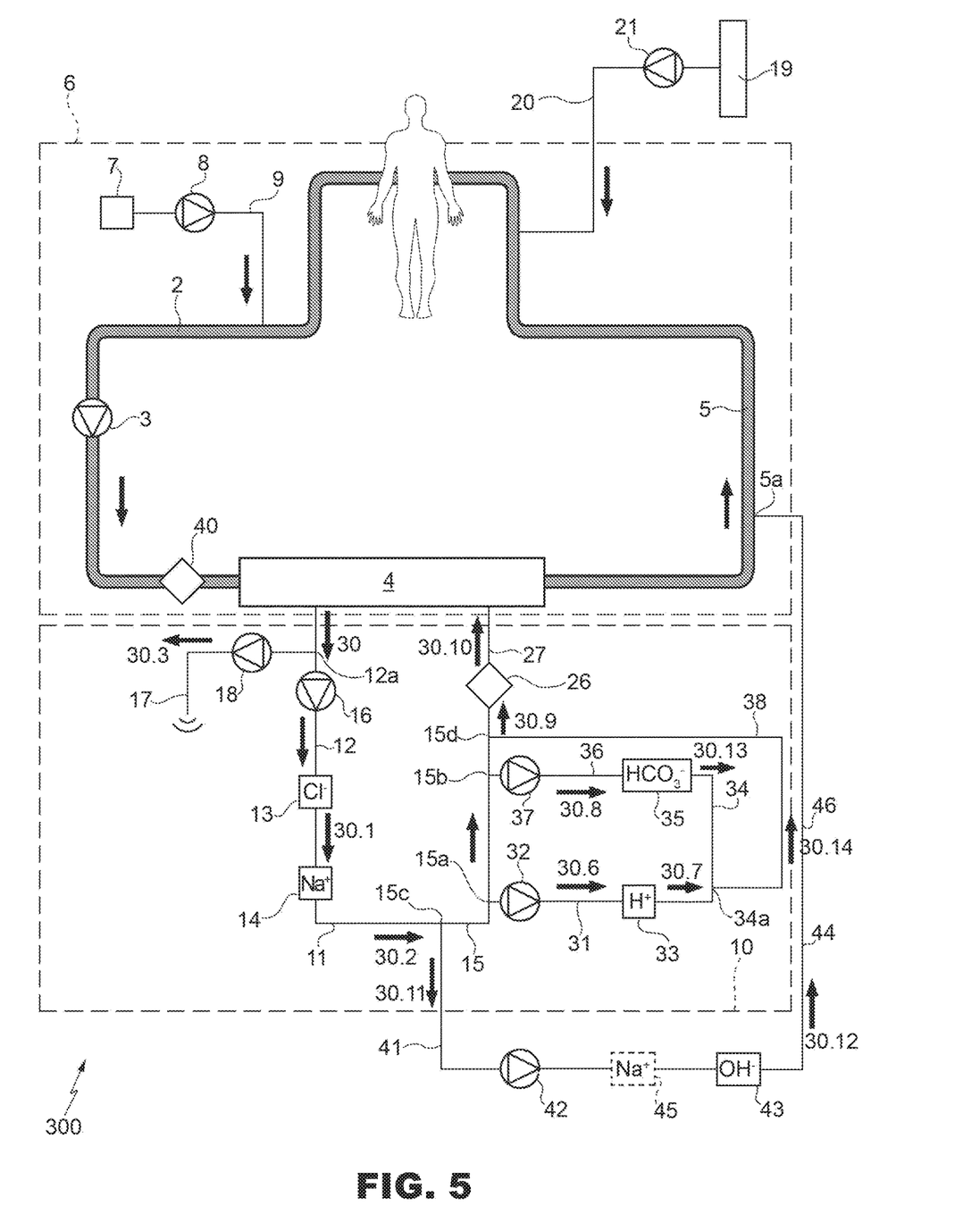
FIG. 5 illustrates a second extracorporeal circulation circuit of the blood for the removal of $CO_2$ comprising the system of FIG. 3.

FIG. 5 illustrates a second embodiment of an extracorporeal circulation circuit 300 of the blood incorporating the system for decoagulation of FIG. 3 in which the removal of $CO_2$ is carried out. Details that are similar or equal to those already described in FIG. 1 are indicated for the sake of simplicity by the same reference numbers.

In detail, to remove $CO_2$, along the line 2 there is a second oxygenator 40. The circuit 300 further comprises a fifth recirculation circuit 46 of the plasma water 30 on the line 5 for reintroducing the blood into the patient.

The fifth recirculation circuit 46 is in fluidic connection with the first recirculation circuit 11 at the node 15*c* located downstream of the second cartridge 14 but upstream of the node 15*d* along the flow direction of the plasma water 30 and with the main circuit 6 at the node 5*a* located downstream of the filtration unit 4 on the line 5. Alternatively, the fifth recirculation circuit 46 can be in fluidic connection with the first recirculation circuit 11 at the node 15*c* and with the main circuit 6 by means of the line 20 for infusion of the solution for electrolyte restoration.

The fifth recirculation circuit 46 comprises the line 41, a sixth cartridge 43 comprising an anion resin charged with hydroxide ions and a line 44.

In use, a third fraction 30.11 of the plasma water 30.2 flowing out of the second cartridge 14 is sent to the node 15*c*, by means of the line 41 and, via the pump 42, to a sixth cartridge 43 comprising an anion-exchange resin charged with hydroxide ions.

Said resin has greater affinity for the chlorine ions present in the plasma water 30.11 than for the hydroxide ions. Therefore, the plasma water 30.12 flowing out of the sixth cartridge 43 is rich in hydroxide ions.

The plasma water 30.12 flowing out of the sixth cartridge 43 is re-sent to the line 5 at the node 5*a* by means of the line 44 contributing to the electrolyte balance of the blood.

In this case therefore the solution for electrolyte restoration can contain lower quantities of hydroxide ions.

Optionally, the fifth recirculation circuit 46 can comprise, upstream of the sixth cartridge 43, along the line 41, a seventh cartridge 45 comprising a cation-exchange resin charged with sodium ions so as to completely eliminate any calcium ions still present in the plasma water 30.11 and avoid their precipitation within and downstream of the sixth cartridge 43.

Alternatively, instead of the seventh cartridge 45, the fifth recirculation circuit 46 can comprise a safety filter to block any calcium crystals that have possibly formed after basification of the plasma water in the sixth cartridge 43.

In this embodiment of the extracorporeal circulation circuit, optionally it is possible to recirculate a fraction of the plasma water flowing out of the third cartridge 33 rich in H+ ions upstream of the second oxygenator 40 in the direction of the blood in the main circuit 6.

The invention claimed is:

1. A system for regional decoagulation of the blood in an extracorporeal circulation circuit comprising a line for drawing the blood from the patient, a filtration unit for separating plasma water, a line for reintroducing the blood into the patient defining a main circuit, the system further comprising: a first bag, a first pump, and/or a first line for infusion of a solution of a citrate or citric acid on said main circuit, which are set upstream of said filtration unit with respect to the direction of the blood flow; a second bag, a second pump, and/or a second line for infusion of a solution for electrolyte restoration on said main circuit, which are set downstream of said filtration unit with respect to the direction of the blood flow; and a secondary circuit for recirculation of the plasma water obtained by said first filtration unit, said secondary circuit comprising: a first cartridge comprising an anion-exchange resin charged with chlorine ions; a second cartridge comprising a cation-exchange resin charged with sodium and potassium ions, which is set downstream of said first cartridge in the direction of flow of the plasma water in the secondary circuit; a third cartridge comprising an anion resin charged with bicarbonate ions, a fourth cartridge comprising a cation resin charged with hydrogen ions, and a first oxygenator, arranged downstream of said third and said fourth cartridges in the direction of flow of the plasma water in said secondary circuit; and a third pump and/or a third line for removal of a first fraction of the plasma water obtained by said filtration unit.

2. The system according to claim 1, wherein the secondary circuit comprises a first recirculation circuit for recirculation of the plasma water on said filtration unit and in that said first and second cartridges are arranged in line on said first recirculation circuit.

3. The system according to claim 1, wherein the secondary circuit comprises a first recirculation circuit, which enables recirculation of the plasma water on said filtration unit and on which said second cartridge is arranged, and a second recirculation circuit, which is in fluidic connection with said first recirculation circuit by a first and a second node and on which said first cartridge is arranged, said first and said second nodes being both arranged upstream of said second cartridge in the direction of flow of the plasma water in said first recirculation circuit.

4. The system according to claim 1, wherein the secondary circuit comprises a second recirculation circuit in fluidic connection with the first recirculation circuit for recirculation of a fraction of the plasma water flowing out of said second cartridge, said second recirculation circuit being in fluidic connection with the first recirculation circuit by a first node, a second node and a third node, said third and fourth cartridges being arranged on said second recirculation circuit and said first, second and third nodes being set downstream of said second cartridge and upstream of the first oxygenator in the direction of flow of the plasma water in said first recirculation circuit.

5. The system according to claim 1, wherein the filtration unit is selected from the group consisting of a haemodiafilter, a haemofilter, a dialyser and a plasma filter.

6. An extracorporeal blood-circulation circuit comprising a regional decoagulation system according to claim 1.

7. The extracorporeal circulation circuit according to claim 6, further comprising:
an oxygenator arranged on said main circuit downstream of said first bag, said first pump, and/or said first line for infusion of a solution of a citrate or citric acid; and
a second recirculation circuit for recirculation of a fraction of the plasma water flowing out of the second cartridge on said main circuit, said second recirculation circuit being in fluidic connection with a first recirculation circuit by a first node and with said main circuit by a second node and comprising a third cartridge comprising a cation-exchange resin charged with hydrogen ions, and wherein said second node is arranged upstream of said oxygenator in the direction of flow of the blood in said main circuit.

8. The extracorporeal circulation circuit according to claim 6, further comprising:
an oxygenator arranged on said main circuit downstream of said means for infusion of a solution of a citrate or citric acid; and
a second recirculation circuit for recirculation of a fraction of the plasma water flowing out of the second cartridge on said main circuit, said second recirculation circuit being in fluidic connection with a first recirculation circuit by a first node and with said main circuit by a second node, and comprising a third cartridge comprising an anion-exchange resin charged with hydroxide ions, and wherein said second node is arranged downstream of said oxygenator and of said filtration unit in the direction of flow of the blood in said main circuit.

9. The extracorporeal circulation circuit according to claim 8, wherein the second recirculation circuit further comprises a third cartridge comprising a cation-exchange resin charged with sodium ions arranged upstream of said third cartridge in the direction of flow of the plasma water in said second recirculation circuit.

* * * * *